June 25, 1957 — F. W. REYNOLDS ET AL — 2,797,179
PROCESS OF FORMING A MOLDED LAMINATE
Filed Dec. 21, 1953 — 2 Sheets-Sheet 1

INVENTOR.
FRANCIS W. REYNOLDS
GEORGE H. KRESS
BY
ATTORNEY

June 25, 1957  F. W. REYNOLDS ET AL  2,797,179
PROCESS OF FORMING A MOLDED LAMINATE
Filed Dec. 21, 1953  2 Sheets-Sheet 2

INVENTOR.
FRANCIS W. REYNOLDS
GEORGE H. KRESS
BY
*P. C. Henninger*
ATTORNEY

United States Patent Office 2,797,179
Patented June 25, 1957

2,797,179

PROCESS OF FORMING A MOLDED LAMINATE

Francis W. Reynolds, Binghamton, and George H. Kress, Endwell, N. Y., assignors to International Business Machines Corporation, New York, N. Y., a corporation of New York Application December 21, 1953, Serial No. 399,561

1 Claim. (Cl. 154—110)

The present invention relates to a laminated plastic body and process for making it and more particularly to a body of reinforced plastic materials which are laminated so as to provide a decorative outer layer, which will be reasonable proof against wear and against damage by different materials which might come in contact therewith, and an inner layer which will impart the desired mechanical strength to the body as a whole. Preferably the outer layer is a layer of embossed vinyl plastic material, which is inherently thermoplastic in nature; while the inner layer is a fiber-reinforced thermosetting material, such as polyester material.

The desirability of producing a laminated material including a vinyl outer layer and a thermosetting, strength-imparting inner layer is known and has been disclosed for example, in the Groff Patent No. 2,219,447, issued October 29, 1940. Vinyl outer layers have many desirable characteristics in that they may be given desired decorative surface treatments, for example, they may have an embossed outer surface which is per se, decorative, while being formed of the vinyl material itself, rather than by some paint, lacquer or similar material coated thereon. Vinyl resins are capable of being formed in many different colors; they are highly resistant to chemical damage by erosion or by chemical staining or other similar damage; they are relative proof against damage by burning, for example, by having lighted cigarettes placed thereon or closely adjacent thereto; and they have a high degree of electrical resistance.

Thermosetting materials such, for example, as polyester materials, particularly when reinforced by fibrous sheet materials such as woven or unwoven sheets, including felted sheets made up of organic textile fibers or inorganic fibers, such as glass or asbestos, have an extremely high tensile strength, sometimes over 50,000 p. s. i.

The desirable characteristics of a laminated material formed of these two types of materials is, therefore, quickly apparent and has been recognized by the prior art. The difficulty of combining these types of materials has also been recognized in that the vinyl resins when molded against cured and infusible thermosetting resins do not adhere thereto. Also, difficulties are encountered in molding vinyl resins against thermosetting resins which are not cured, but are in the potentially reactive state, for the reason that under normal circumstances the conditions of temperature and time required to cause the thermosetting resins to be converted to their final infusible state differ widely from the optimum conditions for molding vinyl resins.

In the Groff patent aforesaid, this difficulty of combining these two types of resins was solved by any of several schemes disclosed, in each of which the thermosetting resin was in effect first formed and cured and the vinyl resin thereafter molded or formed onto the cured thermosetting resin in a manner so as to be adhesively bonded thereto, in some instances by the use of one or more sheets of fibrous material (paper) which were somehow bonded to the thermosetting resin and to which the thermoplastic resin (vinyl resin) was thereafter caused to adhere.

This scheme or any of the schemes disclosed by Groff may be satisfactory when the outer vinyl resin layer is not to have an embossed surface or if the embossed surface is imparted thereto by pressure within the final mold (formed complementary to the desired embossed surface). It has been found, however, that to form a final mold with the necessary complementary surface to give the desired embossed surface to the vinyl layer is wholly impracticable where the body to be formed has a more or less concave-convex shape and particularly where the body has such a shape as to include opposed, substantially parallel surfaces which have to have the desired embossed pattern thereon. Under such circumstances it is practically impossible to remove the finished body from such a mold because of the interlocking between the embossed surface of the vinyl resin and the complementarily shaped surface of the mold, unless the mold is made in a plurality of parts. Here, again, if the mold is made in two or more parts, so as to permit the removal of an article as just described, then the line or juncture between the several independently movable parts of the mold will inevitably leave a visible line or seam on the final object or body to be molded, which is undesired for many purposes.

One of the objects of the present invention is to produce a molded body of the character hereinafter described which has a substantially uniformly embossed outer surface, optically uninterrupted by a seam such as would be formed opposite the joint between two relatively movable parts of a mold, this surface being formed of a vinyl resin. This object is attained by following the process of the present invention, which is in effect a reversal of the process taught by Groff in his patent aforesaid.

Summarizing the present invention, the present process comprises forming a vinyl resin as a sheet which may be calendered in a conventional manner to give it a desired embossed surface during the making thereof and to the opposite or inner surface of which is adhesively or otherwise joined a layer of fibrous material. It has been found that vinyl resins may be adhesively or otherwise joined to such a fibrous layer either by the use of suitable adhesives which are known to the art, or by actually causing a portion of the vinyl resin to penetrate into the fibrous layer to some extent, so as to be mechanically held to the fibrous layer. The formation of a composite vinyl resin-fibrous layer sheet connected together or secured together throughout their area in any desired way and with the open surface of the vinyl resin suitably embossed, is one step in the present invention. From the point of view of this invention it is immaterial whether the embossed surface is prepared prior to the joining of the vinyl resin with the fibrous layer or thereafter and, further, it is immaterial how the vinyl layer is secured throughout its area to the fibrous layer.

The next process step is to combine the vinyl resin-fibrous layer combination aforesaid with the thermosetting material which forms the inner strength-imparting lamination or layer.

The forming of the reinforcing layer or layers and of the combined vinyl-fibrous layer and the curing of the thermosetting material is usually effected in a press, which is equipped with temperature control means sufficient to raise the temperature of the thermosetting material, the polyester material in the present instance, up to the point such that transition thereof to the cured state may be effected within a reasonable time and at a temperature sufficiently low so as not substantially to affect or soften the vinyl layer so as to destroy or seriously to impair the decorative embossed surface thereof. In the case of polyester materials, this is done by adding to the polyester material an oxygen-liberating catalyst along with suitable accelerators, so that when this polyester material is raised to a temperature in the range of about 130° to about 150° F. cure thereof will be initiated. It will be recognized that during curing, polyester material is somewhat exothermic in character, so that the temperature may exceed 150° to some extent at some time during the cure. It will, however, never exceed the temperature to which the thermoplastic material, i. e., the vinyl resin, may be heated without substantial damage thereto, in other words what may be termed for the purposes of the present application, the "softening temperature of the vinyl resin." In this way, therefore, the essential character of the outer embossed or decorated surface is preserved, while securing the necessary adhesion between the vinyl resin-fibrous material layer and the thermosetting material (polyester layer) by permitting the polyester material, which in its uncured form has the consistency of thick cream, physically to penetrate into and mechanically to impregnate a substantial portion at least of the fibrous layer which is secured to the vinyl layer, as aforesaid. This, in effect, welds the several layers together, so that the final body is proof against separation of the various layers or laminations.

Certain details in the forming of the combined vinyl layer-fibrous layer preliminary to the final forming thereof and curing with the thermosetting material are herein disclosed in order that the disclosure shall be complete as to the making of the final articles. This subject matter is, however, not claimed herein, but is also disclosed and is claimed in the co-pending application of L. N. Chellis, Serial No. 399,562, filed December 21, 1953.

The process of the present invention is illustrated in its presently preferred form in the accompanying drawings, in which.

Figure 3:
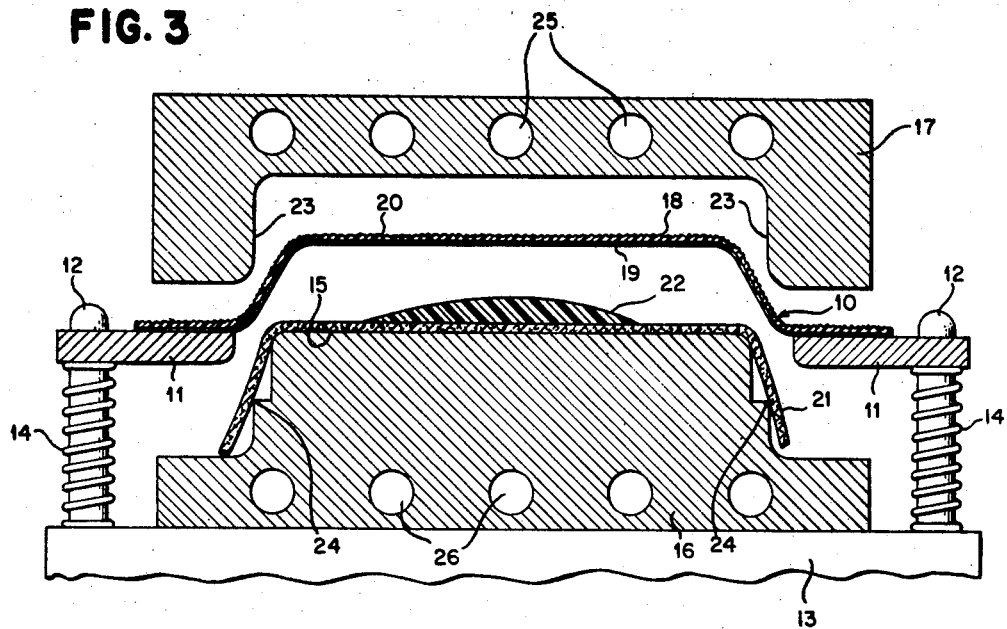
Figure 4:
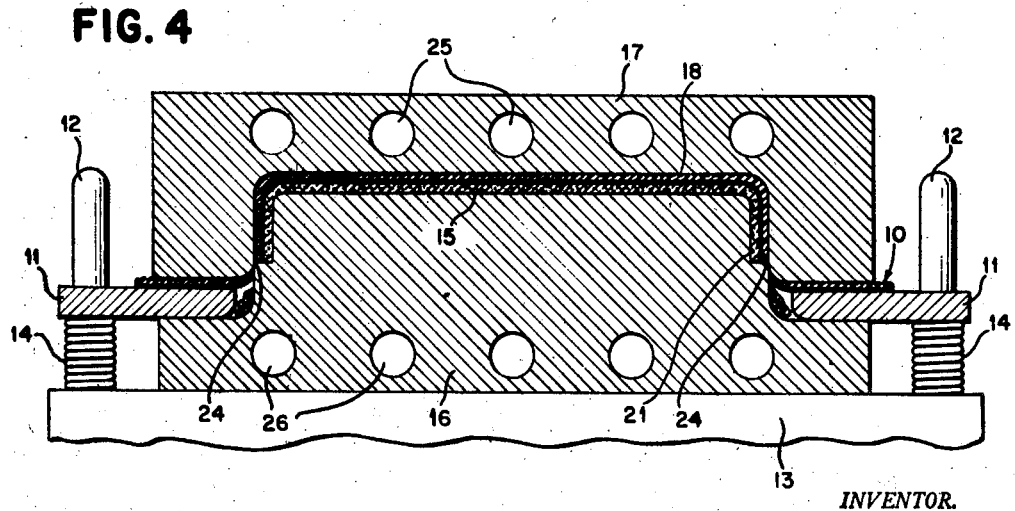

Fig. 3 is a similar view of the same mechanical parts with the vinyl-fibrous layer having its concavity reversed and with the principal reinforcing layer in position to be formed and the unformed, polyester material positioned thereon, the mold members being open; and Fig. 4 is a similar view with the mold members in their final molding position which they occupy during the curing of the thermosetting layer.

While the process of the present invention is adaptable for the forming of articles of many shapes, all preferably of concave-convex character, the present invention is peculiarly adapted for forming a molded laminated body of relatively thin sheet-like section having a form including a substantially planiform central portion and integral side flanges which are substantially perpendicular to the central portion and are disposed on at least two opposite sides thereof, and usually on two pairs of opposite sides, to provide a generally rectangular body, said central portion being connected to the side flanges by integral curved surface portions and the side flanges being connected to one another by similar curved surface portions. Such bodies may be used as panels for enclosing portions of machines, such as office machinery, although they are, of course, not limited to this specific use.

In accordance with the present invention, the desired outside surface layer or lamination which is on the convex side of the desired article, as finally formed, is preferably of a vinyl-plastic material.

By the term "vinyl plastic material" there is intended to be included all polymerized vinyl resins, including polymers and copolymers of vinyl chloride, vinyl acetate, polyvinyl acetals, polyvinylidene and copolymers including polyvinyls and polyvinylidenes. All these resins are thermoplastic in character and have the properties which are mentioned above in greater or less extent. Other polymerized resins having similar properties and which are generally considered in the art to be the equivalent of the vinyl resins above identified, may be considered the equivalent thereof for the purposes of the present application and are to be included generally as equivalents from the point of view of the present specification and appended claims.

As above set forth the fibrous layer, which is first formed against or in some manner secured to the vinyl resin layer, may be either woven or unwoven fibrous material, including felted fibers, fibers of any desired character formed into threads or yarns, then woven, knitted or otherwise formed in a sheet-like fabric. The individual fibers may be either organic or inorganic in character, the only essential element from the point of view of the present invention being that the vinyl layer must be suitably secured to one surface or to one surface portion only of the fibrous layer, either by the use of a suitable adhesive, many of which are known in the art, or by causing portions of the vinyl plastic material to penetrate to some extent into, but not all the way through, the fibrous layer so as mechanically to hold the vinyl-fibrous layer together as an element for further fabrication as hereinafter set forth. A preferred form of the combined vinyl-fibrous layer is where the vinyl layer is secured by mechanical interlocking by partial penetrating into a felted cotton fiber layer, such combined vinyl-fibrous layers being available for purchase on the open market at this time.

The exposed surface of the vinyl layer is embossed to give a pebbly finish, in accordance with the present invention. The particular character of this finish and/or the design thereof is immaterial as long the the finish is one which may be properly described as "embossed," in that all portions thereof do not lie in a single plane, but rather it has portions at different depths when the vinyl layer, considered generally, is lying in a single plane. Such a surface finish may be imparted to the vinyl layer by calendering or pressing sheet vinyl material while this material is in a relative soft and formable or deformable state. This state may be reached by suitably warming or heating the vinyl material; and the surface may thereafter be retained by keeping the material substantially below such softening temperature.

One of the purposes of the present application as aforesaid, is to form the vinyl-fibrous layer to the desired shape without substantially or undesirably changing the surface characteristics of the embossed surface, so as at least to minimize the deforming or distortion of the embossed surface pattern of the vinyl layer. This is preferably effected by maintaining the vinyl layer at a temperature below its softening point, while at the same time preventing, as far as possible, mechanical distortion of the embossed surface by protecting this surface, as far as possible, during the forming thereof as hereinafter particularly described.

Figure 1:
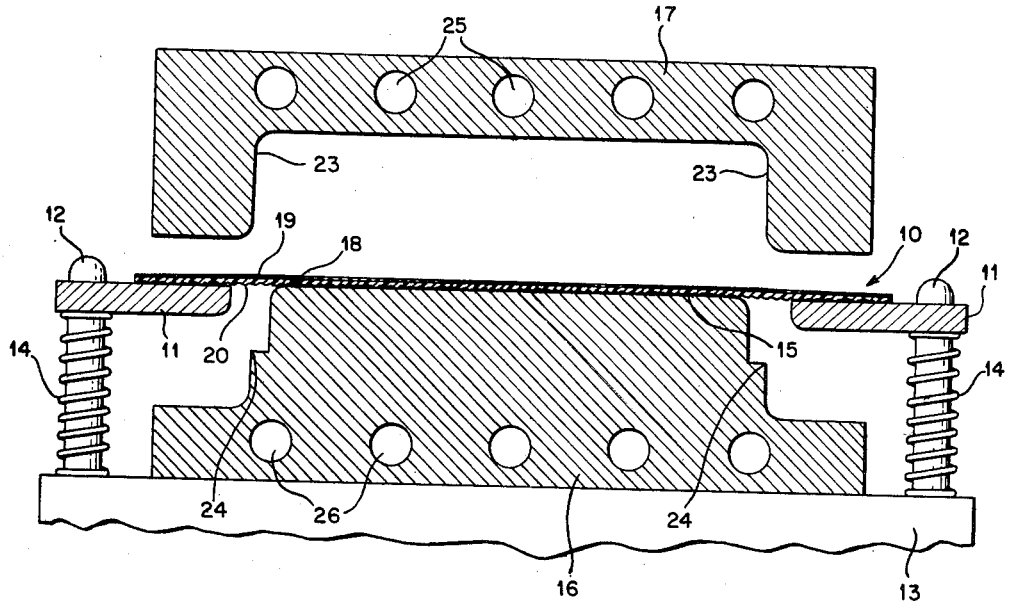
Figure 1 is a view of mold members, diagrammatic and in substantially central vertical section, showing the combined vinyl-fibrous layer in position for the start of the first forming operation, the mold members being separated and the vinyl-fibrous layer being supported in a single plane.
Figure 2:
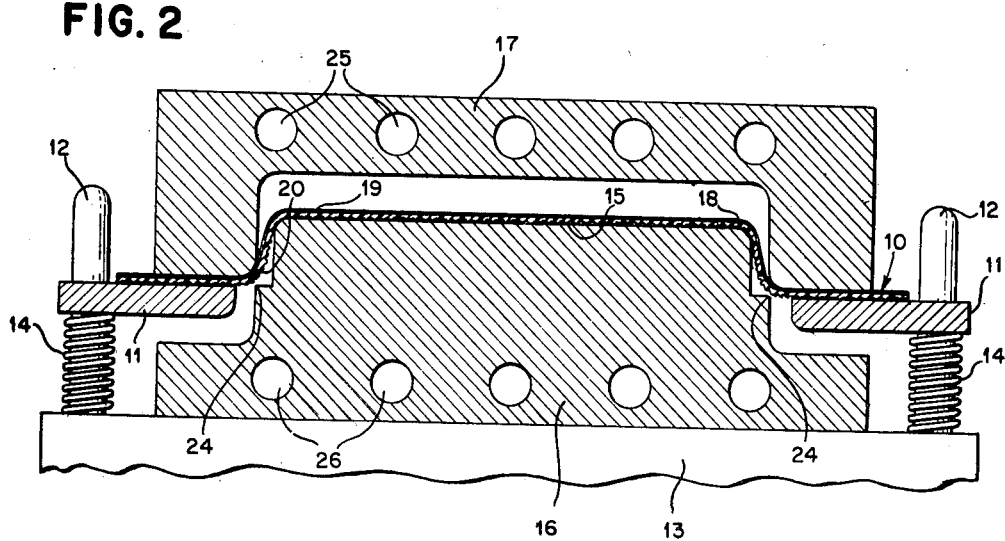
Fig. 2 is a similar view of the parts shown in Fig. 1 with the mold members partially moved together, illustrating a partial forming of the vinyl-fibrous layer with the vinyl layer on the concave side of the partial form.

Figs. 1 and 2 of the accompanying drawings illustrate the first step in the process of forming the combined vinyl-fibrous layer in a way so as to minimize the deforming or distortion of the embossed surface pattern of the vinyl layer  For this purpose the combined vinyl-fibrous layer indicated generally at 10 is placed with its edge portions on a supporting ring 11, which is guided for solely vertical movement by being sleeved upon a number of stationary, vertically extending pins 12. The pins 12 are suitably secured in a base member 13. Intermediate the base 13 and the underside of the ring 11 are disposed helical compression springs 14 surrounding each of the pins 12 respectively. At the upper position of the ring 11, the upper surface thereof is on substantially the same level as the central upper surface portion 15 of a lower mold member 16. Opposite the mold member 16 and substantially complementary therewith, is an upper mold member 17, the arrangement being essentially conventional in character.

The mold members 16 and 17 have smooth surface portions and are not shaped to form or to conform to the embossed surface on the vinyl layer. This embossed surface has previously been formed to a desired pattern by a preliminary treatment not illustrated in the accompanying drawings, and including, for example, such a conventional surface forming means as a shaped calender roll.

As shown in Fig. 1, the combined vinyl-fibrous layer 10 is positioned with the vinyl layer 18 lowermost and the fibrous layer 19 uppermost, so that the lower surface 20 of the vinyl layer 18 is the decorated or embossed surface. When the mold members 16 and 17 are relatively moved toward one another, as seen by a comparison of Figs. 1 and 2, the embossed surface 20 of the vinyl layer is forced against the lower mold; but due to its being against this mold and having substantially no relative movement with respect thereto, this surface is protected against distortion to a maximum extent, even though the movement together of the mold members 16 and 17 is effective to stretch the fibrous layer 19 and to reform the vinyl layer 18 to some extent, bringing these layers to the intermediate shape shown in Fig. 2, but with the embossed surface constituting the concave surface, as seen in that figure. During this period the peripheral portions of the combined layer 10 are clamped resiliently between the ring 11 and the peripheral portion of the upper mold member 17. This also tends toward minimizing distortion of the surface 20.

The partially formed layers shown in Fig. 2 may then be quickly and easily reversed or inverted to the position of the parts shown in Fig. 3, prior to the next forming step, this reversal or inversion of the concave-convex form of the partly formed article or layer shown in Fig. 2 being effected either manually or by some suitable automatic means, not shown. Once the partially formed layer has been reversed, as seen by a comparison of Figs. 2 and 3, this layer is in readiness for the final forming operation.

The strength-imparting thermosetting layer to be combined with the thermoplastic layer previously described, is preferably of a so-called reinforced polyester material. Such materials have now been used quite extensively and are available on the open market from a number of different commercial sources.

Essentially commercial polyester materials are blends of polyhydric alcohol esters of unsaturated acids and unsaturated, polymerizable liquid monomers. The more common of these resins have as the ester fraction the polyfunctional, oxygen-convertible esters of dibasic acids such as fumaric, maleic, itaconic or citraconic acids and polyhydric alcohols such ethylene glycol, propylene glycol, isobutylene glycol, glycerol, methyl glycerol or phthalyl alcohol; or the alcohol reactant may consist of polyhydroxy polymers of these alcohols such as diethylene, triethylene, or tetra-ethylene glycols or polyglycerol. The resulting esters include, for example, ethylene glycol maleate, ethylene glycol fumarate and ethylene glycol itaconate obtained. by reacting ethylene glycol with the unsaturated acid. These esters are in turn blended with polymerizable liquids such as styrene, methyl methacrylate, vinyl acetate, cyclopentadiene, allyl maleate, allyl fumarate, divinyl benzene, etc.

While polyester materials of the type generally set forth are relatively easily cured, it is essential, in accordance with the present invention, that the curing be effected at a relatively low temperature. In order to secure this result and to cure the thermosetting resin, i. e., the polyester material, at a temperature lower than the softening point of the thermoplastic resin (vinyl resin), so as to prevent distortion of the desired embossed surface pattern thereof, it is necessary to add to the polyester resin an oxygen-liberating catalyst combination. Such a combination usually includes an oxygen-liberating material such as benzoyl peroxide and a promoter or accelerator tending to make the oxygen-liberating material or catalyst give up its oxygen to serve as a catalyst, such other material being, for example, diethylaniline. Other combinations of oxygen-liberating catalysts and promoters or accelerators may be used in lieu of the benzoyl peroxide-diethylaniline combination. For example, other combinations contemplated for use, in accordance with the present invention, include (1) methyl ethyl ketone peroxide, plus cobalt naphthenate as a promoter, (2) cyclohexanone peroxide plus "Selectron 5901" as an accelerator plus "Selectron 5923" as a promoter ("Selectron" being a trade name of Pittsburgh Plate Glass Company), and (3) benzoyl peroxide plus promoter No. 607 (the latter is a product of Interchemical Corporation).

Specifically, a practical way of operation is to make two mixes separately, the first mix being, for example, polyester resin—100 parts, benzoyl peroxide—3 parts (both by weight); and the second mix being polyester resin—100 parts, diethylaniline—0.6 part (both by weight). Then, immediately before the polyester resin is to be molded, as hereinafter set forth, the two mixes aforesaid may be mixed together. In this way premature curing of the polyester resin is effectively prevented, while relatively rapid curing at a relatively low temperature, less than the softening point of the vinyl resin, is practically assured. For example, with a mix of the composition set forth, the curing can be effected with the molds at a temperature in the range of about 130° to about 150° F. and in about two to five minutes, i. e., with the mold parts together for a total period of two to five minutes. The final formed article is then removed from the mold and cooled to room temperature.

It is recognized that the curing of polyester resins is an exothermic process, i. e., heat is generated and is given off during the curing operation. This heat will not all be dissipated at the time, but will result in a certain amount of increase in temperature of the article being molded over the 150° F., which is the maximum to which the molds are preferably heated. In general, the temperature of the molds, in accordance with the present invention, should be in the range of about 130–150° F., so that the final highest temperature attained by the body of material being molded will still be less than the softening temperature of the vinyl resin, so as largely to prevent and certainly to minimize the distortion of the embossed surface pattern of the vinyl resin.

As shown in Figs. 3 and 4, one or more layers of fibrous material, generally indicated at 21, is placed in forming position between the mold members 16 and 17. If desired, the layer or layers 21 may be preformed in some other operation in any suitable manner, as is well known to those skilled in the art. On the other hand, in most instances and where the side flanges to be formed are not too deep, it is satisfactory to start with the layers 21 in flat sheet form. The thermosetting resin, which in the case of polyester resins is combined with the oxygen-liberating catalyst as aforesaid, has a consistency of about that of thick cream, is then placed on the layer 21 substantially centrally thereof about as shown at 22. The mold parts 16 and 17 are then brought together as illustrated by a comparison of Figs. 3 and 4, resulting in forming the article to its final desired form and also, in the illustrated embodiment of the invention, in shearing the marginal portions from the desired central portion by coaction between the lateral side portions 23 of the mold member 17 with the shearing edges 24 of the mold member 16.

The mold members are held in the position shown in Fig. 4 for a predetermined time, for example, two to five minutes, during which the temperature of the mold members, coupled with the composition of the thermosetting resin, is effective to cure the thermosetting layer without unduly distorting the surface of the vinyl layer and thus to form the final article. It will be understood, of course, that the mold members 16 and 17 are installed in a conventional manner in a suitable press (not shown) permitting them to be moved relative to one another, as indicated diagrammatically in the accompanying drawings. Also, means are provided for controlling the temperature of the mold members. Such means are illustrated diagrammatically in the accompanying drawings as a plurality of cored holes 25 in the mold member 17 and 26 in the mold member 16. Suitable temperature controlling fluids may be caused to flow through these cored holes. Inasmuch as molding presses and mold temperature control means are both well known in the art, no further detailed showing of these means or description thereof is deemed necessary at this time.

Once the desired molded body has been completely formed, as shown in Fig. 4, it may be removed from the mold by separating the mold members in a conventional manner and by suitably stripping the molded body therefrom. Any desired and/or conventional means (not shown) may be employed for this purpose.

It has been found from many actual tests that when following the procedure set forth herein, the embossed outer surface of the vinyl layer will be prevented from distortion to a maximum extent; that the final article may be suitably molded, as set forth herein by the use of smooth surface molds from which the article may easily be stripped; and that the article as formed, will have an embossed surface which is substantially uniform, both on the central portion and around the curved surface portions, and which is optically uninterrupted by any seam, as would result from forming such a body in a multi-part mold at the juncture of any two parts of such a mold.

While there is herein shown and described a preferred embodiment of the present invention, both from the point of view of the composition of the several layers and from the point of view of the process by which the layers are laminated together, it is recognized that other and equivalent compositions and process steps will suggest themselves to those skilled in the art from the foregoing description. The present invention and the appended claims are intended, therefore, to include all such equivalents as fairly come within the scope thereof.

We claim:

The process of molding a seamless, substantially rigid, laminated body to a predetermined convex-concave form, comprising the steps of first forming an embossed vinyl plastic sheet which is joined throughout its area to an intermediate layer of fibrous material by embossing a surface pattern onto a vinyl plastic sheet which has a softening temperature in excess of 150° F. and joining said vinyl plastic sheet to said intermediate layer, thereafter finally molding an outer layer made up of said vinyl plastic sheet and said intermediate layer with an inner layer made up of fibrous material impregnated with a flowable thermosetting polyester material between a seamless, smooth-surface, concave mold member and a substantially complementary convex mold member, said polyester material as introduced between said mold members having combined therewith an oxygen-liberating catalyst composition of such character and in such amount that said polyester material including said catalyst composition may be converted to its thermoset cured state at a temperature in the range of about 130° to 150° F., and curing said thermosetting polyester material substantially simultaneously with the molding thereof between said mold members and with portions of said polyester material penetrating into so as mechanically to bond with said intermediate layer, while minimizing distortion of the embossed surface pattern of said vinyl plastic sheet of the outer layer by maintaining said mold members at a temperature in the range of about 130° to about 150° F. for the curing of said thermosetting polyester material at a temperature less than the softening point of the thermoplastic vinyl sheet aforesaid.

References Cited in the file of this patent

UNITED STATES PATENTS

| | | |
|---|---|---|
| 1,843,349 | Van Arsdel | Feb. 2, 1932 |
| 1,904,718 | Cochrane | Apr. 18, 1933 |
| 1,912,931 | Clay | June 6, 1933 |
| 2,033,855 | Sloan | Mar. 10, 1936 |
| 2,130,359 | Miller | Sept. 20, 1938 |
| 2,139,541 | Farnsworth | Dec. 6, 1938 |
| 2,234,839 | Edwards | Mar. 11, 1941 |
| 2,441,961 | Gessler et al. | May 25, 1948 |
| 2,464,826 | Neher et al. | Mar. 22, 1949 |
| 2,478,267 | Hickler | Aug. 9, 1949 |
| 2,482,981 | Kamras | Sept. 27, 1949 |
| 2,495,640 | Muskat | Jan. 24, 1950 |
| 2,534,617 | Mohrman | Dec. 19, 1950 |
| 2,579,949 | Minnear | Dec. 25, 1951 |
| 2,598,663 | Kropa | June 3, 1952 |
| 2,698,272 | Clapp et al. | Dec. 28, 1954 |